United States Patent
Naoi et al.

(10) Patent No.: US 9,214,661 B2
(45) Date of Patent: Dec. 15, 2015

(54) ELECTRODE MANUFACTURING METHOD

(75) Inventors: Katsuo Naoi, Tokyo (JP); Kazutoshi Emoto, Tokyo (JP); Kiyonori Hinoki, Tokyo (JP); Masahiro Saegusa, Tokyo (JP); Kenji Nishizawa, Tokyo (JP); Mitsuo Kougo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 867 days.

(21) Appl. No.: 12/547,929

(22) Filed: Aug. 26, 2009

(65) Prior Publication Data

US 2010/0055301 A1 Mar. 4, 2010

(30) Foreign Application Priority Data

Sep. 2, 2008 (JP) ................ P2008-224906

(51) Int. Cl.
*B05D 5/12* (2006.01)
*H01M 4/04* (2006.01)
*H01M 4/139* (2010.01)

(52) U.S. Cl.
CPC ............ *H01M 4/0404* (2013.01); *H01M 4/139* (2013.01); *Y02E 60/122* (2013.01)

(58) Field of Classification Search
USPC ......................................................... 427/77
See application file for complete search history.

(56) References Cited

U.S. PATENT DOCUMENTS

| 6,464,351 | B1 * | 10/2002 | Landry-Coltrain | ...... B41M 5/52 347/105 |
| 2003/0075059 | A1 * | 4/2003 | Mori | .............................. 101/127 |
| 2004/0053122 | A1 * | 3/2004 | Sugiyama et al. | ............ 429/144 |
| 2007/0037047 | A1 * | 2/2007 | Ohashi et al. | ................... 429/99 |
| 2007/0292750 | A1 * | 12/2007 | Beard | ........................... 429/101 |

FOREIGN PATENT DOCUMENTS

| JP | A-10-106546 | 4/1998 |
| JP | A-11-86865 | 3/1999 |
| JP | A-11-185731 | 7/1999 |
| JP | A-11-288741 | 10/1999 |
| JP | A-2001-325951 | 11/2001 |
| JP | A-2007-5323 | 1/2007 |

* cited by examiner

*Primary Examiner* — Austin Murata
(74) *Attorney, Agent, or Firm* — Oliff PLC

(57) ABSTRACT

An electrode manufacturing method which can lower the impedance of electrochemical devices is provided. The electrode manufacturing method comprises the steps of applying a coating material containing an active material particle, a binder, and a good solvent for the binder to a current collector, so as to form a coating film made of the coating material; removing the good solvent from the coating film; applying a poor solvent for the binder to the coating film having removed the good solvent; and pressing the coating film coated with the poor solvent.

5 Claims, 4 Drawing Sheets

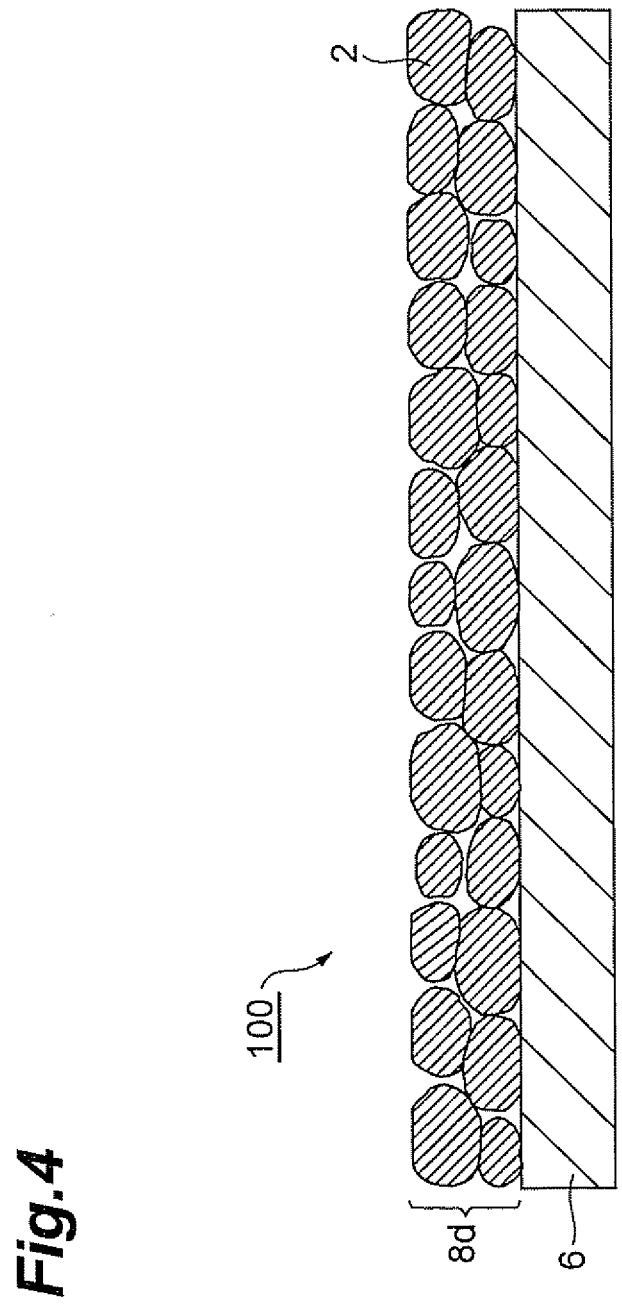

ELECTRODE MANUFACTURING METHOD

BACKGROUND OF THE INVENTION

1. Field of the Invention

The present invention relates to an electrode manufacturing method.

2. Related Background Art

Electrochemical devices such as secondary batteries including lithium-ion secondary batteries and electrochemical capacitors including electric double layer capacitors are easy to reduce their size and weight, and thus are promising as power supplies or backup power supplies for portable devices (small-size electronic devices) and auxiliary power supplies for electric cars and hybrid cars, for example, whereby various studies have been under way in order to improve their performances.

An electrode used in such electrochemical devices has a multilayer structure comprising a current collector and an active material layer, and can be made by applying a coating material containing particles made of an active material, a conductive auxiliary, and the like to a surface of the current collector, for example (see Japanese Patent Application Laid-Open Nos. 10-106546, 11-086865, 11-185731, 11-288741, 2001-325951, and 2007-005323).

SUMMARY OF THE INVENTION

The conventional electrode manufacturing methods disclosed in the above-mentioned Patent Literatures apply a coating material containing a constituent material of the active material layer to the surface of the current collector, so as to form a coating film, and then press the coating film, so as to shape the active material layer. The inventors have found that the following problem exists in such conventional electrode manufacturing methods.

In the conventional electrode manufacturing methods, the thickness and porosity of the active material layer tend to become nonuniform because of pressing. More specifically, in the conventional electrode manufacturing methods, the packing density (density of the active material layer) of particles made of the active material (hereinafter referred to as "active material particles") is likely to become higher on the surface side of the active material layer formed after pressing the coating film and lower on the current collector sheet side of the active material layer. As the density of the active material layer is higher on the surface side, ions which are electric charge carriers are harder to diffuse into the active material layer from the surface thereof. As the density of the active material layer is lower on the current collector side, the electric conductivity of the electrode is easier to decrease.

Because of the foregoing, electrochemical devices equipped with the electrodes manufactured by the conventional manufacturing methods may be problematic in that impedance increases therein.

In view of the problem of the prior art mentioned above, it is an object of the present invention to provide an electrode manufacturing method which can lower the impedance of electrochemical devices.

For achieving the above-mentioned object, the electrode manufacturing method in accordance with the present invention comprises the steps of applying a coating material containing an active material particle, a binder, and a good solvent for the binder to a current collector, so as to form a coating film made of the coating material; removing the good solvent from the coating film; applying a poor solvent for the binder to the coating film having removed the good solvent; and pressing the coating film coated with the poor solvent.

In the present invention, the "good solvent for a binder" refers to a solvent which becomes exothermic by yielding negative heat of mixing when dissolving the binder, while the "poor solvent for a binder" refers to a solvent which becomes endothermic by yielding positive heat of mixing when dissolving the binder. In other words, the "good solvent for a binder" is a solvent which is easy to dissolve the binder, while the "poor solvent for a binder" is a solvent which is hard to dissolve the binder.

In the present invention, when the good solvent is removed from the coating film, the binder is deposited within the coating film and binds the active material particles together. Subsequently, the poor solvent applied to the coating film having removed the good solvent covers the coating film surface and infiltrates into interstices (between the active material particles) in the coating film without dissolving the binder binding the active material particles together. When the coating film thus coated with the poor solvent is pressed, the poor solvent having infiltrated into interstices (between the active material particles) in the coating film serves as a buffer, thereby making it harder for excessive pressures to act on the active material particles and easier for pressures to transmit through the poor solvent to the whole coating film. As a result, the present invention can form the active material layer having a uniform thickness and a uniform porosity in the surface direction.

More specifically, the poor solvent covering the surface of the coating film acts as a buffer in the step of pressing the coating film and thus can inhibit pressing apparatus such as rolls from excessively compacting or collapsing the active material particles on the coating film surface. This lowers the density of the active material layer on the surface side and makes it easier for ions which are electric charge carriers to diffuse into the active material layer from the surface thereof as compared with the electrodes obtained by the conventional manufacturing methods. On the current collector side of the coating film, pressures are easier to act through the poor solvent having infiltrated in the interstices (between the active material particles) in the coating film, thereby appropriately compressing the active material particles. This enhances the density of the active material layer on the current collector side and improves the electric conductivity of the electrode as compared with the electrodes obtained by the conventional manufacturing methods.

Because of the foregoing, electrochemical devices equipped with electrodes obtained by the electrode manufacturing method in accordance with the present invention can lower the impedance as compared with the electrochemical devices equipped with the electrodes obtained by the conventional manufacturing methods.

Preferably, in the present invention, the binder is polyvinylidene fluoride, while the poor solvent is at least one species selected from the group consisting of water, hexane, toluene, xylene, and alcohol.

Employing the combination of the binder and poor solvent mentioned above makes it easier to attain the advantageous effects of the present invention.

Preferably, in the present invention, an amount of the poor solvent applied to the coating film having removed the good solvent or a pressure of pressing the coating film coated with the poor solvent is adjusted such that the coating film has a porosity of 10 to 30 vol % after the pressing.

In the present invention, the volume of the poor solvent existing in the pressed coating film (the active material layer before drying the poor solvent) substantially equals the total volume of pores in the active material layer. Therefore, when the amount of the poor solvent applied to the coating film having removed the good solvent or the pressure of pressing the coating film coated with the poor solvent is adjusted such that the volume of the poor solvent existing in the coating film after the pressing is 10 to 30 vol % of the whole coating film, the active material layer can attain a porosity of 10 to 30 vol % in the present invention. Hence, the present invention can adjust the porosity of the active material layer to a desirable value. An electrochemical device using an electrode equipped with an active material layer having a porosity of 10 to 30 vol % is easier to further lower the impedance as compared with electrochemical devices equipped with electrodes obtained by the conventional manufacturing methods.

The present invention can provide an electrode manufacturing method which can lower the impedance of electrochemical devices.

BRIEF DESCRIPTION OF THE DRAWINGS

FIG. 4 is a schematic sectional view of an electrode obtained by the electrode manufacturing method in accordance with the embodiment of the present invention.

REFERENCE SIGNS LIST

Figure 1:
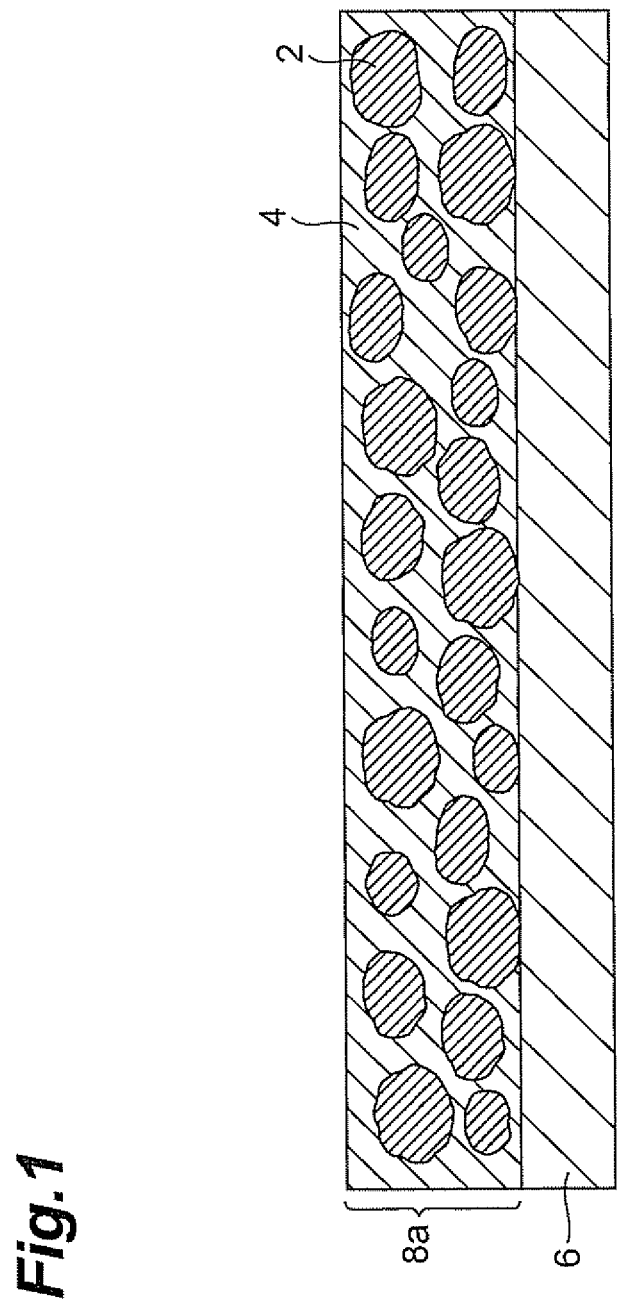
FIG. 1 is a schematic sectional view of a current collector and a coating film made of a coating material applied onto the current collector, illustrating a coating film forming step in the electrode manufacturing method in accordance with an embodiment of the present invention.

2 ... active material particle; 4 ... good solvent for a binder; 6 ... current collector; 8a, 8b, 8c ... coating film; 8d ... active material layer; 10 ... poor solvent for the binder; 12 ... calender roll; 100 ... electrode

DESCRIPTION OF THE PREFERRED EMBODIMENTS

In the following, as a preferred embodiment of the electrode manufacturing method in accordance with the present invention, a method of manufacturing an electrode used in a lithium-ion secondary battery will be explained in detail with reference to the drawings. Though the lithium-ion secondary battery comprises positive and negative electrodes as electrodes, the following will explain a manufacturing method common in both positive and negative electrodes without distinguishing them from each other except for respective materials used for manufacturing the positive and negative electrodes. In the drawings, the same or equivalent parts will be referred to with the same signs while omitting their overlapping explanations. Positional relationships such as upper, lower, left, and right will be based on positional relationships represented in the drawings unless otherwise specified. Ratios of dimensions in the drawings are not limited to those depicted.

The electrode manufacturing method in accordance with this embodiment comprises a step (coating film forming step: S1) of applying a coating material containing active material particles, a binder, a good solvent for the binder, and a conductive auxiliary to a sheet-shaped current collector so as to form a coating film made of the coating material; a step (good solvent removing step: S2) of removing the good solvent from the coating film; a step (poor solvent coating step: S3) of applying a poor solvent for the binder to the coating film having removed the good solvent; a step (pressing step: S4) of pressing the coating film coated with the poor solvent; and a step (poor solvent removing step: S5) of removing the poor solvent from the pressed coating film.

Coating Film Forming Step: S1

In the coating film forming step, a coating material in which active material particles, a binder, and a conductive auxiliary are dispersed in a good solvent for the binder is initially prepared. Subsequently, as illustrated in FIG. 1, the coating material is applied to a surface of a current collector 6, so as to form a coating film 8a made of the coating material. For simplification, FIG. 1 illustrates only the active material particles 2 and good solvent 4 among the substances contained in the coating film 8a, while omitting the conductive auxiliary and the binder dissolved in the good solvent 4.

For manufacturing positive and negative electrodes as the electrode, it will be sufficient if the coating material contains the active material particles 2 constituted by positive and negative electrode active materials, respectively.

The positive electrode active material is not limited in particular as long as it allows occlusion and release of lithium ions, desorption and insertion (intercalation) of lithium ions, or doping and undoping of lithium ions and their counter anions (e.g., $PF_6^-$) to proceed reversibly. Its usable examples include lithium cobaltate ($LiCoO_2$), lithium nickelate ($LiNiO_2$), lithium manganese spinel ($LiMn_2O_4$), mixed metal oxides expressed by the general formula of $LiNi_xCo_yMn_zM_aO_2$ (where $x+y+z+a=1$, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn or Fe, Mg, Nb, Ti, Al, and Zr, or VO), and lithium titanate ($Li_4Ti_5O_{12}$).

The negative electrode active material is not limited in particular as long as it allows occlusion and release of lithium ions, desorption and insertion (intercalation) of lithium ions, or doping and undoping of lithium ions and their counter anions (e.g., $PF_6^-$) to proceed reversibly. Its usable examples include carbon materials such as natural graphite, synthetic graphite, non-graphitizing carbon, graphitizable carbon, and low-temperature-firable carbon; metals such as Al, Si, and Sn which are combinable with lithium; amorphous compounds mainly composed of oxides such as $SiO_x$ (where $1 < x \leq 2$) and $SnO_x$ (where $1 < x \leq 2$); lithium titanate ($Li_4Ti_5O_{12}$); and $TiO_2$.

Usable examples of the binder include polyvinylidene fluoride (PVDF), polytetrafluoroethylene (PTFE), carboxymethyl cellulose (CMC), and styrene-butadiene rubber (SBR). Also employable as the binder are fluororesins/fluorine rubbers (hereinafter referred to as "VDF copolymers") such as fluorine rubbers based on vinylidene fluoride/ hexafluoropropylene (VDF/HFP-based fluorine rubbers) and those based on vinylidene fluoride/hexafluoropropylene/tetrafluoroethylene (VDF/HFP/TFE-based fluorine rubbers). CMC and SBS may be used in combination.

As the good solvent 4 for the binder, one conforming to the binder in use is selectively employed as appropriate. When PVDF is used as the binder, N-methylpyrrolidone (NMP) is employed alone or in combination with others as the good solvent 4. When CMC or SBR is used as the binder, water and alcohols (methanol, ethanol, propanol, butanol, etc.) are employed singly or in combination as the good solvent 4. When a VDF copolymer is used as the binder, acetone is employed alone or in combination with others as the good solvent 4. When PTFE is used as the binder, PTFE can be used alone as it is without adding solvents other than PTFE to the coating material. Hence, PTFE serves as both the binder and the good solvent for preparing the coating material.

The conductive auxiliary is not restricted in particular. Its usable examples include carbon blacks; carbon materials; powders of metals such as copper, nickel, stainless steel, and iron; mixtures of carbon materials and powders of metals; and conductive oxides such as ITO.

As the current collector 6, it will be sufficient if a good conductor which fully allows electric charges to migrate to the active material layer is used; its usable examples include foils of metals such as copper and aluminum. It will be preferred in particular if one which does not form any alloy with lithium is used as the current collector for the negative electrode, while one which does not corrode is used as the current collector for the positive electrode.

Good Solvent Removing Step: S2

Figure 2:
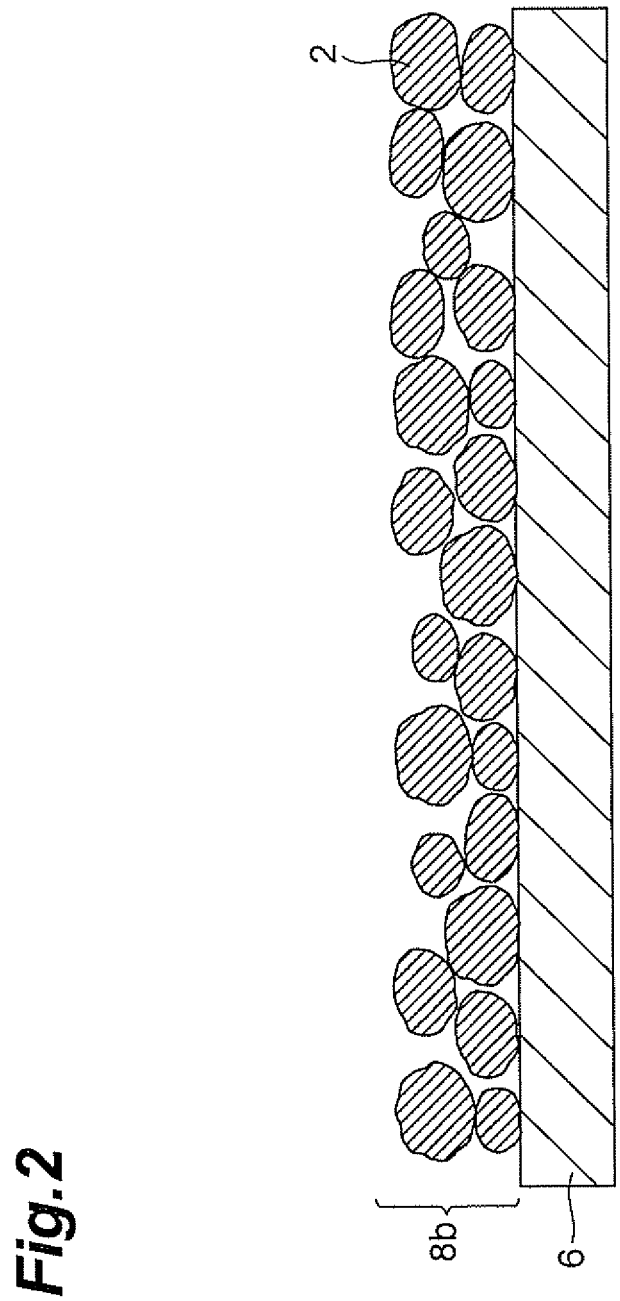
FIG. 2 is a schematic sectional view of the coating film having removed a good solvent, illustrating a step of removing the good solvent in the electrode manufacturing method in accordance with the embodiment of the present invention.

In the step of removing the good solvent 4, the coating film 8a is dried, so as to remove the good solvent 4 from the coating film 8a, whereby the binder dissolved in the good solvent 4 is deposited between the active material particles 2, between pieces of the conductive auxiliary, and between the active material particle 2 and the conductive auxiliary. This yields a coating film 8b made of the active material particles 2 and conductive auxiliary bound together by the binder as illustrated in FIG. 2. For simplification, FIG. 2 omits the conductive auxiliary and binder.

Poor Solvent Coating Step: S3

Figure 3:
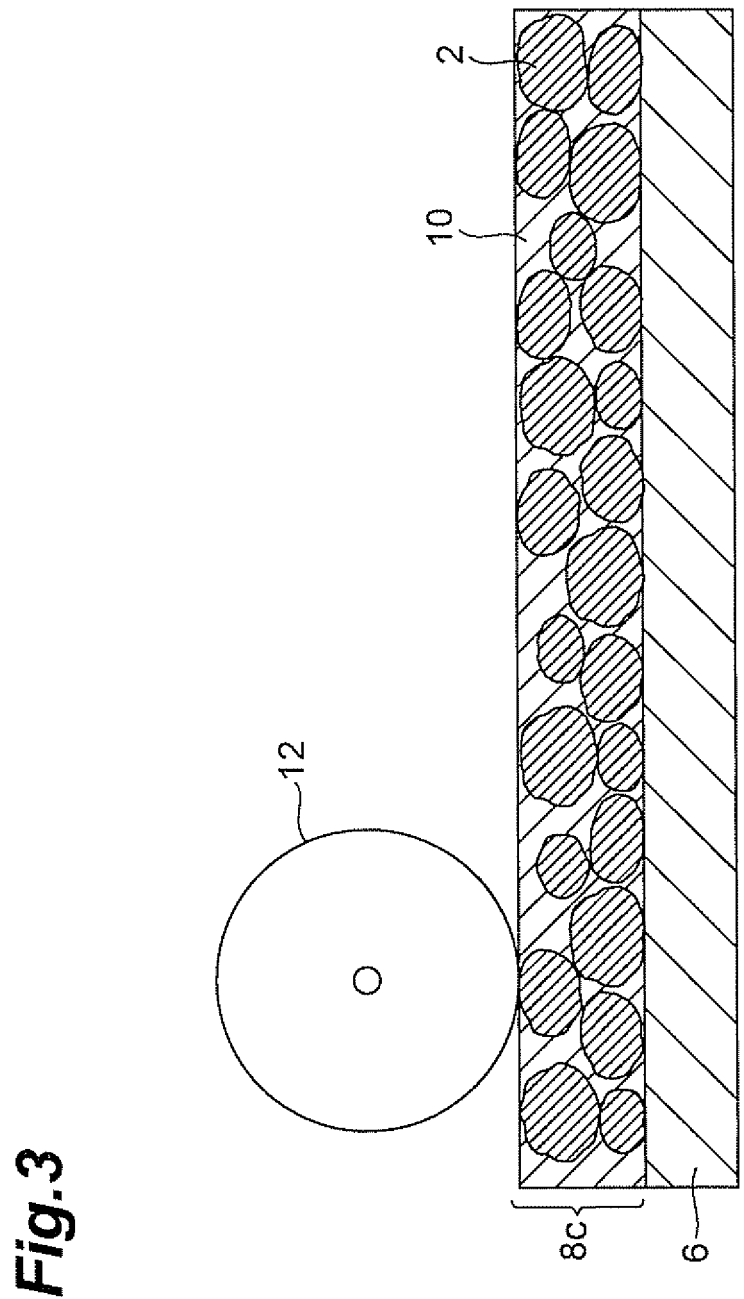
FIG. 3 is a schematic sectional view of the coating film coated with a poor solvent, the current collector formed with the coating film, and a calender roll for pressing the coating film, illustrating a step of applying the poor solvent and a pressing step in the electrode manufacturing method in accordance with the embodiment of the present invention.

In the poor solvent coating step, as illustrated in FIG. 3, a poor solvent 10 for the binder is applied to the coating film 8b having removed the good solvent 4, so as to infiltrate into interstices (between the active material particles 2 and conductive auxiliary) in the coating film 8b, thereby forming a coating film 8c. Since the binder is hard to dissolve in the poor solvent 10, the poor solvent 10 hardly dissolves the binder binding the active material particles 2 and conductive auxiliary together. Therefore, in the coating film 8c coated with the poor solvent 10, the active material particles 2 and conductive auxiliary are kept in the state where they are bound together by the binder.

When applying the poor solvent 10 to the coating film 8b having removed the good solvent 4, it will be preferred if the surface of the coating film 8b is covered with the poor solvent 10. In other words, the coating film 8b is preferably coated with the poor solvent 10 by such an amount that the solid part (constituted by the active material particles 2 and conductive auxiliary) is fully immersed in the poor solvent 10 in the coating film 8c after being coated with the poor solvent 10. This allows the poor solvent 10 to infiltrate throughout the coating film 8c, whereby the advantageous effects of the present invention are obtained more easily.

As the poor solvent 10 for the binder, a solvent in conformity to the binder in use is selectively employed as appropriate. When PVDF or PTFE is used as the binder, water, acetone, methylethylketone (MEK), hexane, toluene, xylene, and alcohols (methanol, ethanol, propanol, butanol, etc.) are employed singly or in combination as the poor solvent 10. When a VDF copolymer is used as the binder, water, hexane, toluene, xylene, and alcohols (methanol, ethanol, propanol, butanol, etc.) are employed singly or in combination as the poor solvent 10. When CMC or SBR is used as the SPE layer binder, acetone, MEK, hexane, toluene, and xylene are employed singly or in combination as the poor solvent 10.

Pressing Step: S4

In the pressing step, as illustrated in FIG. 3, the whole surface of the coating film 8c coated with the poor solvent 10 is pressed (roll-processed) by a calender roll 12. Hence, the coating film 8c in a wet state is pressed. In the pressing step, the coating film 8c may be pressed while the surface of the calender roll or the coating film 8c is heated. This makes it easier to process the coating film 8c into a desirable form.

Poor Solvent Removing Step: S5

In the step of removing the poor solvent 10, the pressed coating film 8c is dried, so as to remove the poor solvent 10 from the coating film 8c. This yields an electrode 100 comprising the current collector 6 and an active material layer 8d formed on the surface of the current collector 6.

When making a lithium-ion secondary battery by using negative and positive electrodes obtained by the manufacturing method in accordance with this embodiment, negative and positive electrode leads are electrically connected to the negative and positive electrodes, respectively, at first. Subsequently, a separator is arranged between the negative and positive electrodes such as to be in contact therewith, thus forming a power generating element. Here, the negative and positive electrodes are arranged such that their respective surfaces on the negative and positive electrode active material layer sides are in contact with the separator.

Next, the power generating element is inserted into a case having an opening, and an electrolytic solution is her injected therein. Subsequently, in a state where respective portions of negative and positive electrode leads are inserted into the case while the remaining portions are arranged on the outside of the case, the opening of the case is sealed, whereby a lithium-ion secondary battery is completed.

In this embodiment, the poor solvent having infiltrated into interstices (between the active material particles 2 and conductive auxiliary) in the coating film 8c serves as a buffer in the pressing step as illustrated in FIG. 3, thereby making it harder for excessive pressures to act on the active material particles 2 and conductive auxiliary and easier for pressures to transmit through the poor solvent 10 to the whole coating film 8c. This can form the active material layer 8d having a uniform thickness and a uniformly porous surface as illustrated in FIG. 4.

More specifically, the poor solvent 10 covering the surface of the coating film 8c acts as a buffer in the pressing step as illustrated in FIG. 3 and thus can inhibit the calender roll 12 from excessively compacting or collapsing the active material particles 2 on the surface of the coating film 8c. This lowers the density of the active material layer 8d on the surface side in FIG. 4 and decreases the ion diffusion resistance in the active material layer 8d as compared with the electrodes obtained by the conventional manufacturing methods.

On the current collector 6 side of the coating film 8c in FIG. 3, pressures are easier to act through the poor solvent 10 having infiltrated in the interstices (between the active material particles 2 and conductive auxiliary) in the coating film 8c, so as to compress the active material particles 2 and conductive auxiliary appropriately. This enhances the density of the active material layer 8d on the current collector 6 side in FIG. 4 and improves the electric conductivity of the electrode 100 as compared with the electrodes obtained by the conventional manufacturing methods.

Because of the foregoing, the lithium-ion secondary battery equipped with the electrode 100 obtained by the electrode manufacturing method in accordance with this embodiment lowers the impedance and improves the output and capacity as compared with the lithium-ion secondary batteries equipped with the electrodes obtained by the conventional manufacturing methods.

When the coating film made of the coating material containing the good solvent 4 for the binder as illustrated in FIG. 1 is pressed by the calender roll, a part of the coating film 8a tends to peel off from the current collector 6, so as to transfer to the calender roll surface, thereby missing a part of the pressed coating film 8a or causing the coating film 8a to have a nonuniform thickness. By contrast, such inconveniences can be avoided in this embodiment, since the coating film 8c coated with the poor solvent 10 is pressed as illustrated in FIG. 3. Thus, as compared with the case of pressing the coating film 8a made of the coating material containing the good solvent 4, the coating film 8c is harder to drop out after the pressing in this embodiment, whereby the amounts of active material particles and conductive auxiliary to be carried by the current collector 6 can be adjusted precisely at the stage of coating material making and coating film forming step (S1).

Preferably, in this embodiment, the binder is PVDF, while the poor solvent is at least one species selected from the group consisting of water, hexane, toluene, xylene, and alcohol. Employing such a combination of the binder and poor solvent 10 makes it easier to attain the advantageous effects of the present invention.

Preferably, in this embodiment, the content of the poor solvent 10 contained in the coating film 8c after the pressing is set to 10 to 30 vol % by adjusting the amount of the poor solvent 10 applied to the coating film 8b having removed the good solvent 4 in the step of applying the poor solvent 10 or by adjusting the pressure of pressing the coating film 8c coated with the poor solvent 10 in the pressing step. Specifically, it will be preferred if the linear pressure for pressing the coating film 8c coated with the poor solvent 10 is 50 to 800 kgf/cm (500 to 8000 N/cm). The content of the poor solvent 10 contained in the coating film 8c after the pressing tends to become greater and smaller as the linear pressure in the pressing step is higher and lower, respectively. Therefore, it will be preferred if the amount of the poor solvent 10 applied to the coating film 8b having removed the good solvent 4 is appropriately increased or decreased, such that the content of the poor solvent 10 contained in the coating film 8c after the pressing is adjusted to 10 to 30 vol %.

The volume of the poor solvent 10 existing in the coating film 8c after the pressing (the active material layer 8d before drying the poor solvent 10) substantially coincides with the total volume of voids in the active material layer 8d. Therefore, when the volume of the poor solvent 10 existing in the coating film 8c after the pressing is 10 to 30 vol % of the whole coating film 8c, the resulting active material layer 8d can attain a porosity of 10 to 30 vol %. The lithium-ion secondary battery using the electrode 100 equipped with the active material layer 8d having such porosity is easier to lower the impedance as compared with lithium-ion secondary batteries equipped with the electrodes obtained by the conventional manufacturing methods.

The electrode manufacturing method in accordance with this embodiment is suitable as a method of manufacturing an electrode for a battery having a large capacity of 2 Ah or more or an electrode having a large area of 100 mm×100 mm or more.

Though a preferred embodiment of the present invention is explained in detail in the foregoing, the present invention is not limited to the above-mentioned embodiment.

For example, a polyelectrolyte layer may further be formed on the surface of the active material layer 8 in FIG. 4. Alternatively, a porous insulating layer may further be formed on the surface of the active material layer 8d. After the pressing, a coating material for forming a polyelectrolyte layer or insulating layer may directly be applied to the coating film 8c before removing the poor solvent 10.

Though the above-mentioned embodiment explains the case where the electrochemical device is a lithium-ion secondary battery, the electrochemical device is not limited to the lithium-ion secondary battery, but may be secondary batteries other than the lithium-ion secondary battery, such as metal lithium secondary batteries, and electrochemical capacitors such as lithium capacitors. The electrochemical device equipped with the electrode obtained by the manufacturing method of the present invention can also be used in power supplies for self-propelled micromachines and IC cards, and decentralized power supplies placed on or within printed boards.

The present invention will now be explained more specifically with reference to examples and comparative examples, which do not restrict the present invention.

Example 1

Making of Positive Electrode Coating Material

Active material particles made of lithium cobaltate ($LiCoO_2$; product name: Selion, manufactured by Seimi Chemical Co., Ltd.), PVDF as a binder, and carbon black (product name: DAB, manufactured by Denki Kagaku Kogyo K.K.) as a conductive auxiliary were dispersed in NMP which was a good solvent for PDVF, so as to prepare a positive electrode coating material.

Making of Negative Electrode Coating Material

Active material particles made of graphite (product name: OMAC, manufactured by Osaka Gas Chemicals Co. Ltd.), PVDF as a binder, and carbon black (product name: DAB, manufactured by Denki Kagaku Kogyo K.K.) as a conductive auxiliary were dispersed in NP which was a good solvent for PDVF, so as to prepare a negative electrode coating material.

Making of Positive Electrode

Coating Film Forming Step: S1

In the coating film forming step, the positive electrode coating material was applied to a surface of a sheet-like current collector made of aluminum, so as to form a coating film made of the positive electrode coating material. Here, the amount of the positive electrode coating material applied to the current collector was adjusted such that the mass of the active material particles carried per unit area of the current collector was 10.0 mg/cm$^2$.

Good Solvent Removing Step: S2

In the good solvent removing step, the coating film was dried in a drying furnace, so as to remove NMP (the good solvent) from the coating film.

Pressing Solvent Coating Step: S3

In the poor solvent coating step, xylene which was a poor solvent for the binder was applied as a pressing solvent to the whole surface of the coating film (hereinafter referred to as "dry coating film") having removed NMP (the good solvent), so as to form a pressing coating film. For applying xylene (the pressing solvent), a gear pump having a supply capacity of 1.2 cc/rev was used. The gear pump was actuated 32 times (i.e., at 32 Hz). In the following, the amount of the pressing solvent applied was represented by the number of actuations of the gear pump (unit: Hz).

Pressing Step: S4

In the pressing step, the whole surface of the pressing coating film was pressed by a calender roll. The linear pressure exerted on the pressing coating film by the calender roll was 200 kgf/cm. In the above-mentioned pressing solvent coating step and pressing step, the processing speed of the coating film was 5 m/min.

Pressing Solvent Removing Step: S5

In the pressing solvent removing step, the pressed coating film was dried in the drying furnace, so as to remove xylene (the pressing solvent) from the coating film. The current collector formed with the coating film (positive electrode active material layer) having removed xylene was cut into a size of 100 mm×10 mm, so as to yield a positive electrode comprising the current collector and the positive electrode active material layer formed on the surface of the current collector.

Making of Negative Electrode

A negative electrode was formed as with the positive electrode except that the negative electrode coating material was used and that the applied amount and linear pressure of the pressing solvent were as listed in Table 1.

Measurement of Porosity

The porosity (unit: vol %) of the positive electrode active material layer in the positive electrode was calculated from the amount carried (total mass of the active material particles, binder, and conductive auxiliary) per unit area of the current collector, the thickness of the active material layer, and the specific gravity of the combined agents (solids in the coating material). Also, the porosity of the negative electrode active material layer in the negative electrode was calculated as in the positive electrode. Table 1 shows the results.

Making of Lithium-ion Secondary Battery

Respective leads were electrically connected to the positive and negative electrodes, and a separator was arranged between the negative and positive electrodes such as to be in contact therewith, thus forming a power generating element. Here, the positive and negative electrodes were arranged such as to be in contact with the separator. As the separator, one made of polyethylene was used.

Next, the power generating element was inserted into a case of a battery, and an electrolytic solution was further injected therein. As the electrolytic solution, one dissolving $LiPF_6$ at a concentration of 1.5 M in a mixed solvent of PC (propylene carbonate), EC (ethylene carbonate), and DEC (diethyl carbonate) (the volume ratio of PC/EC/DEC being 2:1:7) was used. Subsequently, while respective portions of the positive and negative electrode leads were inserted in the case, the opening of the case was sealed under vacuum, so as to complete the lithium-ion secondary battery of Example 1 having a capacity of 2 Ah.

Measurement of Impedance

The impedance (unit: mΩ) of the lithium-ion secondary battery of Example 1 was determined. Table 1 shows the result.

Examples 2 to 7

In Examples 2 to 7, positive and negative electrodes and lithium-ion secondary batteries were prepared as in Example 1 except that the poor solvents for PVDF listed in Table 1 were used as the pressing solvent and that the applied amounts and linear pressures of the pressing solvent were as listed in Table 1. The porosity of each of the positive and negative electrodes and the impedance of each lithium-ion secondary battery in Examples 2 to 7 were determined as in Example 1. Table 1 shows the results.

In Table 1, A, B, C, and D denote the respective cases where the impedance was 4.4 or less, the impedance was greater than 4.4 but not more than 4.7, the impedance was greater than 4.7 but not more than 5.0, and the impedance was greater than 5.0 or could not be determined since the positive or negative electrode could not be formed. The lower the impedance is, the more preferred it is.

Comparative Example 1

Comparative Example 1 tried to make positive and negative electrodes as in Example 1 except that N-methyl-2-pyrrolidone (NMP), which was a good solvent for PVDF, was used as the pressing solvent and that the applied amount and linear pressure of the pressing solvent were as listed in Table 1. In Comparative Example 1, however, the coating film peeled off from the current collector and transferred to the surface of the calender roll in the pressing step, whereby the positive and negative electrodes and the lithium-ion secondary battery could not be made.

Comparative Examples 2 AND 3

Comparative Examples 2 and 3 did not carry out the step of coating the pressing solvent. Hence, Comparative Examples 2 and 3 directly pressed the coating film made of the positive electrode coating material and the coating film made of the negative electrode coating material by the applied amounts and linear pressures listed in Table 1. The positive and negative electrodes and lithium-ion secondary batteries of Comparative Examples 2 and 3 were made as in Example 1 except for the foregoing. The porosity of each of the positive and negative electrodes and the impedance of each lithium-ion secondary battery in Comparative Examples 2 and 3 were determined as in Example 1. Table 1 shows the results.

Comparative Example 4

Comparative Example 4 tried to make positive and negative electrodes as in Example 1 except that a mixture of NMP and water, which were good and poor solvents for PVDF, respectively, was used as the pressing solvent and that the applied amount and linear pressure of the pressing solvent were as listed in Table 1. In Comparative Example 4, however, PVDF binding the active material particles and the conductive auxiliary together in the dried coating film was eluted into the mixed solvent and came into contact with water in the mixed solvent, so as to be deposited as a solid in the mixed solvent. As a result, Comparative Example 4 could not form the positive and negative electrode active material layers, thus failing to make the positive and negative electrodes and the lithium-ion secondary battery.

Comparative Example 5

Comparative Example 5 did not carry out the good solvent removing step. Hence, Comparative Example 5 directly applied xylene, which was a poor solvent for PVDF, as the pressing solvent to the coating film made of the positive electrode coating material and the coating film made of the negative electrode coating material. As a result, a part of the binder dissolved in the coating film was deposited laminarly at the interface between the coating film made of the positive or negative electrode coating material and xylene (pressing solvent) applied to the coating film. Also, the good solvent for PVDF contained in each coating film was extracted with xylene acting as a solvent.

After pressing each coating film, xylene and the good solvent extracted into xylene were dried together, so as to form the positive and negative electrode active material layers.

The positive and negative electrodes and lithium-ion secondary battery of Comparative Example 5 were made as in Example 1 except for the foregoing. The porosity of each of the positive and negative electrodes and the impedance of the lithium-ion secondary battery in Comparative Example 5 were determined as in Example 1. Table 1 shows the results.

TABLE 1

| | | Pressing solvent | Positive electrode | | | Negative electrode | | | Impedance (mΩ) | Evaluation |
|---|---|---|---|---|---|---|---|---|---|---|
| | | | Pressing solvent coating amount (Hz) | Linear pressure (kgf/cm) | Porosity (vol %) | Pressing solvent coating amount (Hz) | Linear pressure (kgf/cm) | Porosity (vol %) | | |
| Example 1 | xylene | poor solvent | 32 | 200 | 29.7 | 32 | 50 | 27.7 | 4.8 | C |
| Example 2 | xylene | poor solvent | 24 | 400 | 24.8 | 24 | 100 | 22.6 | 4.7 | B |
| Example 3 | xylene | poor solvent | 16 | 800 | 20.2 | 16 | 200 | 18.0 | 4.3 | A |
| Example 4 | toluene | poor solvent | 16 | 800 | 19.8 | 16 | 200 | 17.5 | 4.4 | A |
| Example 5 | hexane | poor solvent | 16 | 800 | 19.7 | 16 | 200 | 17.5 | 4.5 | B |
| Example 6 | acetone | poor solvent | 16 | 800 | 19.3 | 16 | 200 | 17.2 | 4.9 | C |
| Example 7 | water | poor solvent | 16 | 800 | 20.3 | 16 | 200 | 18.1 | 5 | C |
| Comparative Example 1 | NMP | good solvent | 32 | 200 | not measurable | 32 | 50 | not measurable | not measurable | D |
| Comparative Example 2 | — | — | — | 600 | 25.8 | — | 150 | 23.6 | 7.0 | D |
| Comparative Example 3 | — | — | — | 1200 | 20.7 | — | 300 | 18.5 | 7.0 | D |
| Comparative Example 4 | MMP water | good solvent poor solvent | — | — | not measurable | — | — | not measurable | not measurable | D |
| Comparative Example 5 | xylene | poor solvent | 16 | 800 | 21 | 16 | 200 | 19.1 | 6.5 | D |

Letting P [kgf/cm] be a linear pressure listed in Table 1, this linear pressure is converted into P×g [N/cm], where g is the gravitational acceleration, which is about 9.80665 m/s².

It was verified that the impedance was lower in Examples 1 to 6 than in Comparative Examples 2, 3, 5.

What is claimed is:

1. An electrode manufacturing method comprising the steps of:
    applying a coating material containing an active material particle, a binder, and a good solvent for the binder to a current collector, so as to form a coating film made of the coating material;
    dry-removing the good solvent from the coating film;
    coating a poor solvent for the binder on the coating film such that a solid portion of the coating film is completely immersed in the poor solvent after having removed the good solvent;
    pressing the coating film coated with the poor solvent; and
    removing the poor solvent after pressing the coating film.

2. The electrode manufacturing method according to claim 1, wherein:
    the binder is polyvinylidene fluoride; and
    the poor solvent is at least one species selected from the group consisting of water, hexane, toluene, xylene, and alcohol.

3. The electrode manufacturing method according to claim 1, wherein an amount of the poor solvent applied to the coating film after having removed the good solvent or a pressure of pressing the coating film coated with the poor solvent is adjusted such that the coating film has a porosity of 10 to 30 vol % after the pressing.

4. The electrode manufacturing method according to claim 1, wherein:
    the binder is polyvinylidene fluoride;
    the poor solvent is at least one species selected from the group consisting of water, hexane, toluene, xylene, and alcohol; and
    an amount of the poor solvent applied to the coating film after having removed the good solvent or a pressure of pressing the coating film coated with the poor solvent is adjusted such that the coating film has a porosity of 10 to 30 vol % after the pressing.

5. The electrode manufacturing method according to claim 1, wherein the electrode is an electrode of a lithium ion secondary battery.

* * * * *